United States Patent
Pearce et al.

(10) Patent No.: US 8,550,287 B2
(45) Date of Patent: Oct. 8, 2013

(54) SEALING A FUEL TANK AGAINST HYDROCARBON PERMEATION

(75) Inventors: Russell R. Pearce, Ann Arbor, MI (US);
Daniel F. Cragel, Livonia, MI (US);
Kenneth J. Kuenzel, Saline, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 13/324,159

(22) Filed: Dec. 13, 2011

(65) Prior Publication Data
US 2013/0146595 A1    Jun. 13, 2013

(51) Int. Cl.
*B65D 6/40*   (2006.01)
*F16J 15/10*   (2006.01)
(52) U.S. Cl.
USPC .......................... 220/661; 277/649; 220/678
(58) Field of Classification Search
USPC ................ 220/586, 581, 661, 678, 681, 677;
206/0.6; 277/649, 648, 644
IPC ....... B65D 6/40; F17C 1/02; F16J 15/10,15/06, F16J 15/02
See application file for complete search history.

(56) References Cited

U.S. PATENT DOCUMENTS

| | | | |
|---|---|---|---|
| 5,425,470 A * | 6/1995 | Duhaime et al. | 220/62.11 |
| 6,533,288 B1 * | 3/2003 | Brandner et al. | 277/630 |
| 6,719,163 B1 * | 4/2004 | Delbarre et al. | 220/562 |
| 2005/0269333 A1 * | 12/2005 | Burrington et al. | 220/562 |
| 2008/0197578 A1 * | 8/2008 | Osborne | 277/590 |

FOREIGN PATENT DOCUMENTS

EP     1285746 A1 *  2/2003

* cited by examiner

*Primary Examiner* — Robert J Hicks
(74) *Attorney, Agent, or Firm* — James Dottavio; MacMillan, Sobanski & Todd, LLC

(57) ABSTRACT

A tank connection includes a tank formed with a plastic wall having multiple thicknesses, a first thickness being substantially impervious to hydrocarbon permeation, the wall having an opening surrounded by an edge of the wall, a component secured by a weld to an outer surface of the wall, and seal substantially impervious to hydrocarbon permeation, contacting a surface of the component, and biased into elastic contact with said edge.

19 Claims, 4 Drawing Sheets

SEALING A FUEL TANK AGAINST HYDROCARBON PERMEATION

BACKGROUND OF THE INVENTION

1. Field of the Invention

This invention relates generally to a connection on a plastic tank, and more particularly to a sealed connection that is impervious to hydrocarbon permeability.

2. Description of the Prior Art

As acceptable levels of hydrocarbon emissions are lowered by governmental agencies, hydrocarbon permeation at welded connections to plastic tanks has been recognized as a principal source of such permeation in fuel tanks.

To eliminate permeation paths through the tank wall plastic that is impervious to hydrocarbon permeability is incorporated in the wall. Components welded to the outer surfaces of plastic fuel tanks require communication to the internal storage area of the fuel tank. The weld is located external to the tank and radially outside of the outer diameter of the cut hole. If a hole is cut in the tank wall to provide access to the tank's contents, the hole compromises the integrity of the plastic that is used to prevent hydrocarbon permeability.

A need exists in the industry to seal the discontinuity at the hole and to restore hydrocarbon impermeability without deviating substantially from current plastic fuel tank production methods including use of the access hole.

SUMMARY OF THE INVENTION

A tank connection includes a tank formed with a plastic wall having multiple thicknesses, a first thickness being substantially impervious to hydrocarbon permeation, the wall having an opening surrounded by an edge of the wall, a component secured by a weld to an outer surface of the wall, and seal substantially impervious to hydrocarbon permeation, contacting a surface of the component, and biased into elastic contact with said edge.

A method for sealing a tank connection includes providing a tank formed with a plastic wall substantially impervious to hydrocarbon permeation, the wall having an opening surrounded by an edge, installing in a component a seal substantially impervious to hydrocarbon permeation, and welding the component to an outer surface of the wall such that the seal contacts an inner surface of the component, and is biased into elastic contact with said edge.

The seal is internal to the weld that joins the component to the outer surface of the tank wall and is located such that a compression seal is elastically preloaded when the component is secured to the tank.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
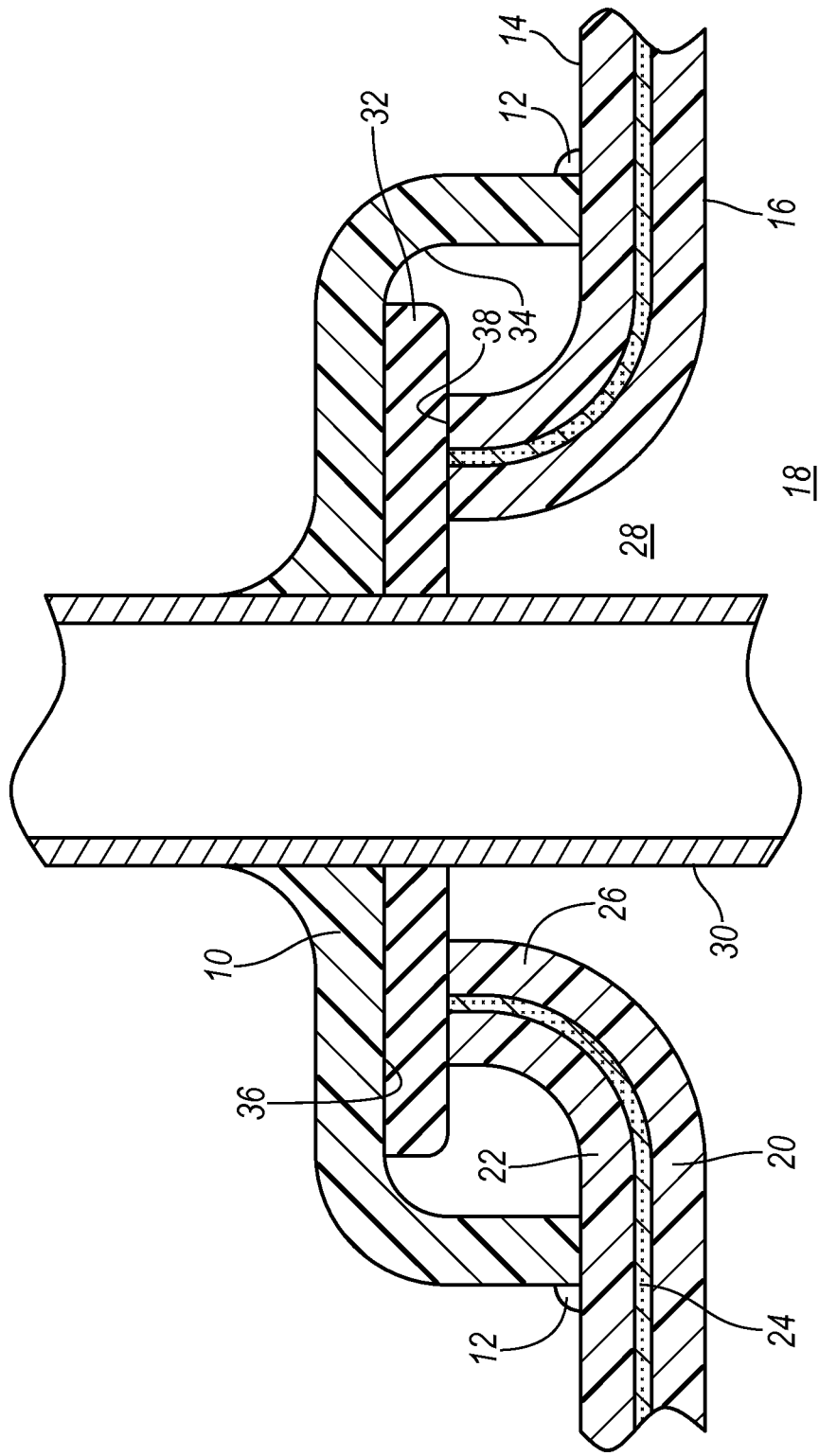
FIG. 1 is cross section showing a seal contacting the edge of a hole formed in a fuel tank wall.

Referring now to FIG. 1, a component 10 is secured by a weld 12 to the outer surface 14 of the plastic wall 16 of a fuel tank 18. The weld 12 extends around the periphery of the component 10.

The plastic wall 16 includes inner and outer thicknesses 20, 22 of plastic material, preferably high-density polyethylene (HDPE), and an intermediate thickness 24 of plastic material, preferably ethylene vinyl alcohol (EVOH). The intermediate thickness 24 is substantially impervious to hydrocarbon permeation. The thicknesses 20, 22, 24 of the tank wall 16 are secured mutually when the wall is formed by conforming the wall to the shape of a mold, heating the materials of the wall, allowing the wall materials to fuse together at elevated temperature, and cooling the tank wall materials.

The wall 16 is extruded outward 26 from the interior of tank 18, the extrusion 26 surrounding an opening 28 in the wall, through which a tube 30 of the component 10 extends into the tank 18. The tube 30 provides a passage extending through the component 10 and communicates with an interior of the tank 18 through the opening 28.

An elastic compression seal 32, secured to an inner surface 34 of component 10, closes the opening 28, overlaps the free edge 38 of the wall 16 at the opening, and contacts the inner surface 36 component 10. Preferably seal 32 engages the intermediate thickness 24 around the periphery of opening 28 to create a substantially impervious seal. Preferably seal 32 is of fluoro-carbon rubber, which is substantially impervious to hydrocarbon permeation. Seal 32 may be of another elastic material that is elastically compressible due to contact with the wall edge 38. Seal 32 prevents passage of hydrocarbons between the wall edge 38 and the seal and between tube 30 and the seal. Preferably seal 32 is bonded to the inner surface 34 of component 10.

Component 10 is preferably formed of HDPE. Tube 30 is preferably of Acetyl plastic or another dimensionally stable material such as metal. Tube 30 is preferably joined to component 10 by an over-mold process, which bonds the tube to the component forming a connection that is impervious to hydrocarbon permeation.

Figure 2:
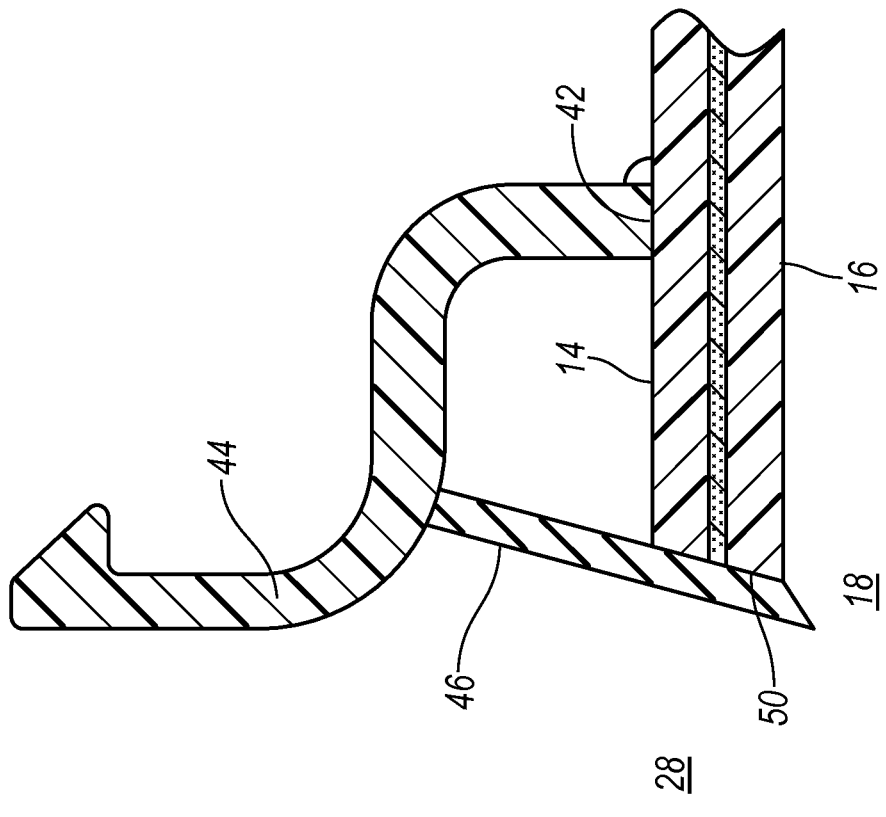
FIG. 2 is a cross section showing a conical seal contacting the beveled edge of a hole formed in a fuel tank wall.
Figure 2:
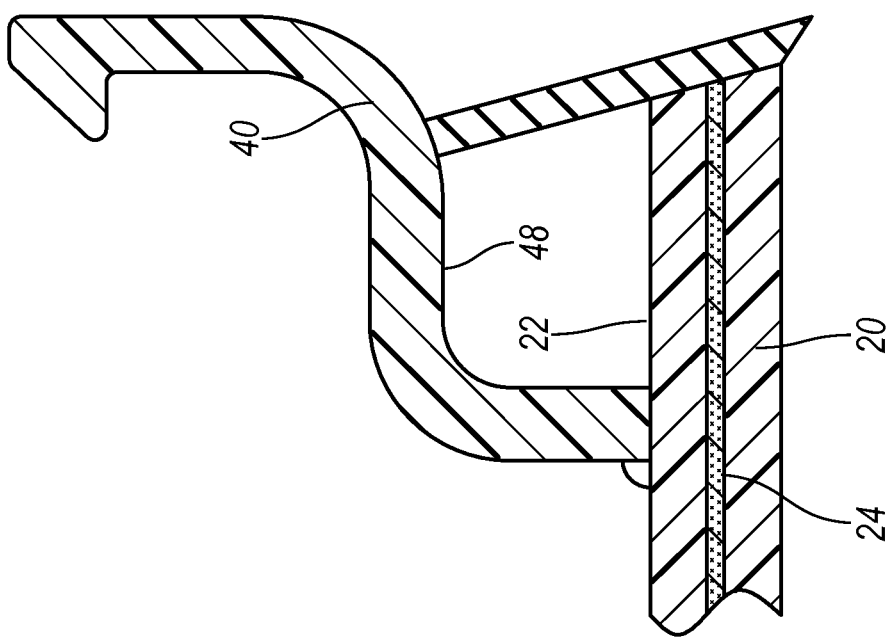

FIG. 2 shows a component 40 secured by a hot-plate weld 42 to the outer surface 14 of the wall 16 of fuel tank 18. Weld 42 extends around the periphery of component 40. Component 40 is formed with a tube 44, which communicates through an opening 28 in the wall 16 with the interior of tank 18. Preferably component 40 is formed of HDPE.

A conical barrier seal 46, secured to an inner surface 48 of component 40, surrounds the opening 28 and contacts the free edge 50 of the wall 16 at the opening. The edge 50 is beveled, i.e., inclined relative to the plane of wall 16. Preferably seal 46 is of fluoro-carbon rubber, which is substantially impervious to hydrocarbon permeation and compressible by contact with the wall edge 50, thereby preventing passage of hydrocarbons between the wall edge 38 and the seal 46. Seal 46 may be bonded to the inner surface 48 of component 40 or formed integrally with the component, or bonded to the wall 16.

Figure 3:
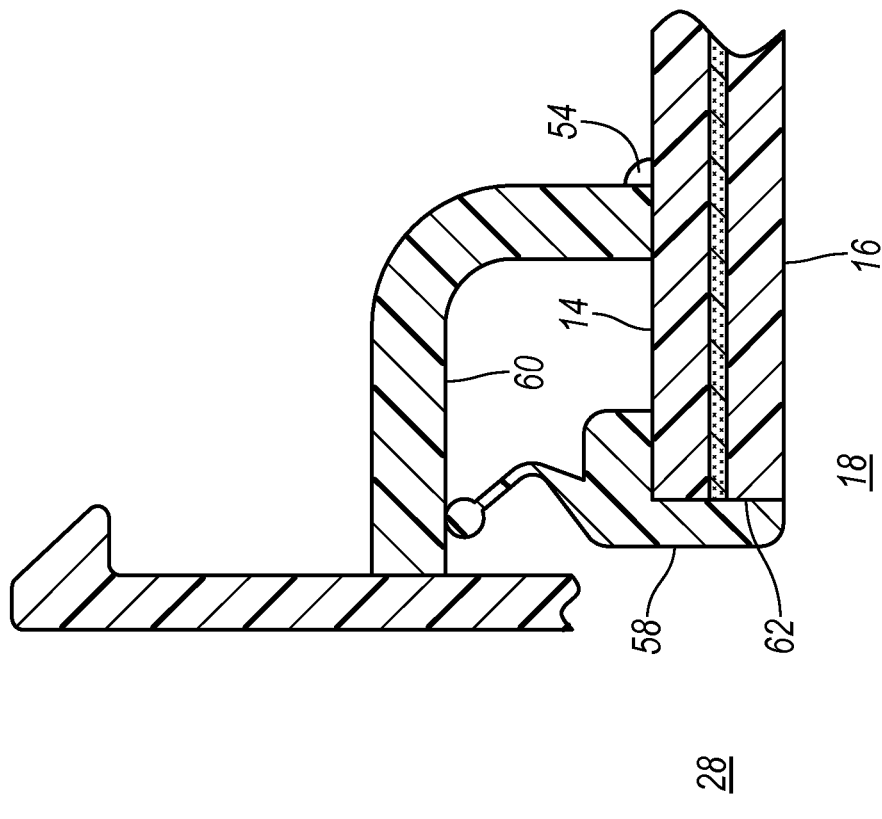
FIG. 3 is a cross section showing a rubber seal contacting the edge of a hole formed in a fuel tank wall.
Figure 3:
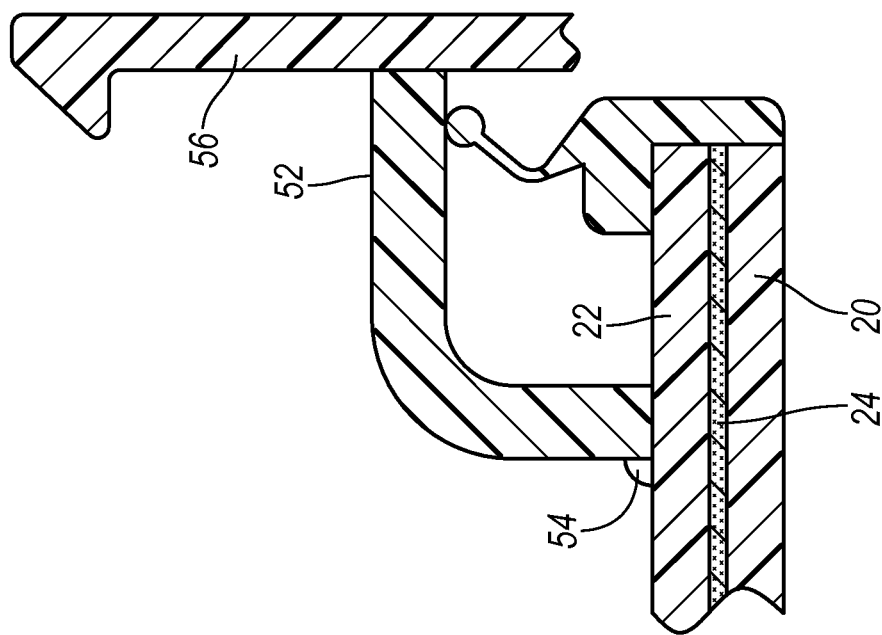

FIG. 3 shows a component, tank spud 52, secured by a hot-plate weld 54 to the outer surface 14 of the wall 16 of fuel tank 18. Weld 54 extends around the periphery of the tank spud 52, which is formed with a tube 56, which communicates through an opening 28 in the wall 16 with the interior of tank 18. Tank spud 52 is preferably formed of HDPE. Tube 56 is preferably of Acetyl plastic or another dimensionally stable material such as metal. Tube 56 is preferably joined to tank spud 52 by an over-mold process, which bonds the tube to the tank spud 52 forming a connection that is impervious to hydrocarbon permeation. The location of the interface between tank spud 52 and the Acetyl tube 56 may be at any location along the tank spud 52.

A seal 58, molded or bonded to wall 16, surrounds the opening 28 and contacts the free edge 62 of the wall 16 at the opening. Seal 58 is biased elastically into contact with the inner surface 60 of component 52 and into elastically contact with the upper surface 14 of wall 16. Preferably seal 58 is of fluoro-carbon rubber, which is substantially impervious to hydrocarbon permeation and elastically compressible due to contact with component 52 and surface 14, thereby preventing passage of hydrocarbons between the wall edge 62 and the seal 46.

Figure 4:
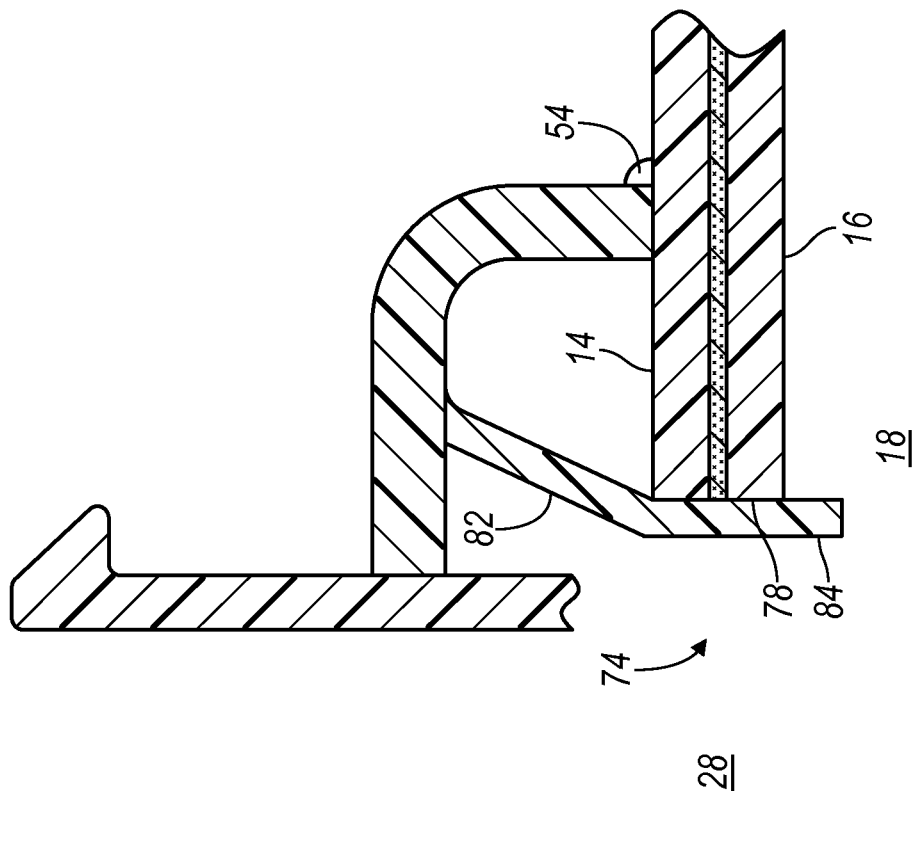
FIG. 4 is a cross section showing a rubber seal bonded to a tank component and contacting the edge of a hole formed in a fuel tank wall.
Figure 4:
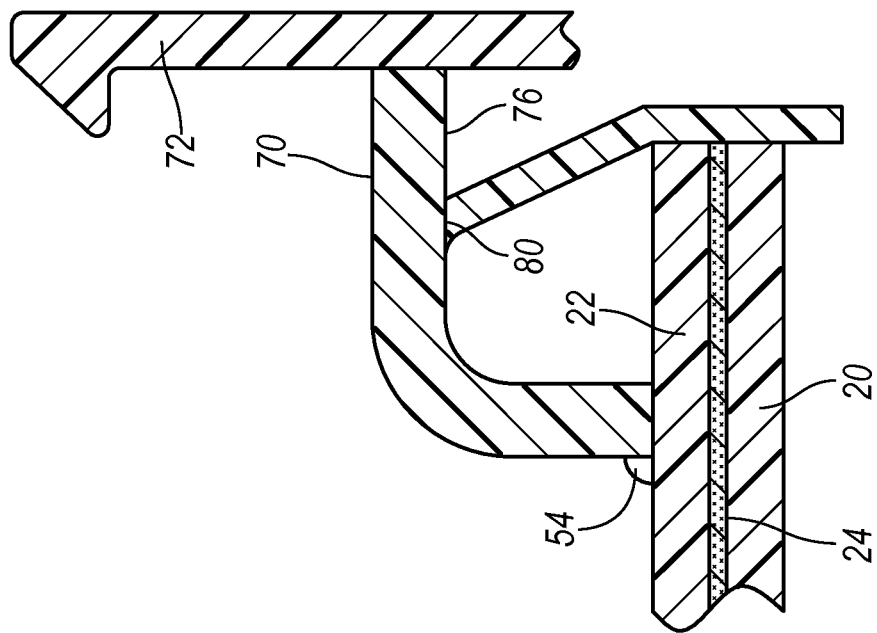

FIG. 4 shows a component, tank spud 70, secured by a hot-plate weld 54 to the outer surface 14 of the wall 16 of fuel tank 18. Weld 54 extends around the periphery of component 52. Tank spud 70 is formed with a tube 72, which communicates through an opening 28 in the wall 16 with the interior of tank 18. Tank spud 70 is preferably formed of HDPE. Tube 72 is preferably of Acetyl plastic or another dimensionally stable material such as metal. Tube 72 is preferably joined to component 70 by an over-mold process, which bonds the tube to the component forming a connection that is impervious to hydrocarbon permeation. The location of the interface between tank spud 70 and the Acetyl tube 72 may be at any location along the tank spud 70.

A tapered conical barrier seal 74, contacting an inner surface 76 of tank spud 70, surrounds the opening 28 and contacts the free edge 78 of the wall 16 at the opening. Preferably seal 74 is of fluoro-carbon rubber, which is substantially impervious to hydrocarbon permeation and elastically compressible due to contact with the wall edge 78, thereby preventing passage of hydrocarbons between the wall edge 78 and the seal 74. Preferably seal 74 is bonded at 80 to the inner surface 76 of tank spud 70, or seal 74 may be formed integrally with tank spud 70.

Seal 74 includes a conical first portion 82 located inside the component and contacting the tank spud 70. The seal 74 includes a cylindrical second portion 84 connected to the first portion and extending toward an interior of the tank. The second portion 84 is biased into elastic contact with the edge 78 due to contact with the edge and covers the edge.

In accordance with the provisions of the patent statutes, the preferred embodiment has been described. However, it should be noted that the alternate embodiments can be practiced otherwise than as specifically illustrated and described.

The invention claimed is:

1. A tank connection, comprising:
a tank including a plastic wall substantially impervious to hydrocarbon permeation including an opening surrounded by a planar edge;
a tube;
a component including a second edge contacting and secured to an outer surface of the wall, and a second opening bonded to the tube;
a rubber seal substantially impervious to hydrocarbon permeation, contacting an inner surface of the component, and biased into elastic contact with said planar edge.

2. The tank connection of claim 1, wherein the wall comprises:
an inner thickness of plastic material;
an outer thickness of plastic material; and
a first thickness of plastic material, located between the inner and outer thicknesses, and fused integrally to the inner and outer thicknesses.

3. The tank connection of claim 1, wherein:
the wall comprises an extrusion directed outward from the tank into an interior of the component;
the seal is secured to the component and covers said planar edge.

4. The tank connection of claim 1, wherein the tube is formed integrally with the component and includes a passage extending through the component and communicating with an interior of the tank.

5. The tank connection of claim 1, wherein:
said planar edge surrounding the opening is beveled relative to a plane of the wall; the seal is secured to the component, biased into elastic contact with the planar edge, and covers said planar edge.

6. The tank connection of claim 1, wherein:
the component defines a space; and
the seal is located inside the space defined by the component and covers said planar edge.

7. The tank connection of claim 1, wherein the seal is secured to the component.

8. The tank connection of claim 1, wherein the seal comprises:
a first portion located inside the component, contacting the component, and including conical surface; and
a second portion connected to the first portion and extending toward an interior of the tank, the second portion being biased into elastic contact with the planar edge and covering said planar edge.

9. A connection for a tank opening, comprising:
a tank including a wall having an opening surrounded by a planar edge;
a component including a second edge contacting and secured to an outer surface of the wall, including a second opening formed with a tube;
a seal substantially impervious to hydrocarbon permeation, contacting a surface of the component, and biased into elastic compression contact with said planar edge.

10. The connection of claim 9, wherein the seal is secured to the component, and covers said planar edge.

11. The connection of claim 9 wherein the seal is secured to the component, and is able to covers a beveled edge of the wall at the opening.

12. The connection of claim 9, wherein:
the component defines a space; and
the seal is located inside the space defined by the component, and covers said planar edge.

13. The connection of claim 9, wherein the seal is secured to the component.

14. The connection of claim 9, wherein the seal comprises:
a first portion located inside the component, able to contact the component, and includes a conical surface; and
a second portion connected to the first portion and able to extend toward an interior of the tank, the second portion able to be biased into elastic contact with the planar edge and covering said planar edge.

15. A method for sealing a tank connection, comprising
(a) providing a tank formed with a plastic wall substantially impervious to hydrocarbon permeation and an opening having a planar edge;
(b) installing in a component a seal substantially impervious to hydrocarbon permeation;
(c) welding a second edge of the component to the wall such that the seal contacts an inner surface of the component, and is biased into elastic compression contact with said planar edge.

16. The method of claim 15, wherein step (a) further comprises:
providing a tank having an inner thickness, an outer thickness, and an intermediate thickness located between the inner and outer thicknesses and fused integrally to the inner and outer thicknesses.

17. The method of claim 15, wherein step (a) further comprises:
forming the wall with an extrusion directed outward from the tank into an interior of the component.

18. The connection of claim 9, wherein the seal is of rubber.

19. The connection of claim 1, wherein the seal is biased into elastic compression contact with the planar edge.

\* \* \* \* \*